(12) United States Patent
Sasaki

(10) Patent No.: US 6,490,099 B2
(45) Date of Patent: Dec. 3, 2002

(54) LENS DEVICE

(75) Inventor: Ryuta Sasaki, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/790,521

(22) Filed: Feb. 23, 2001

(65) Prior Publication Data

US 2001/0015861 A1 Aug. 23, 2001

(30) Foreign Application Priority Data

Feb. 23, 2000 (JP) ........................................ 2000-046204

(51) Int. Cl.[7] .............................................. G02B 15/14
(52) U.S. Cl. ........................................ 359/700; 359/699
(58) Field of Search ................................ 359/699, 700, 359/703, 704, 826, 701

(56) References Cited

U.S. PATENT DOCUMENTS 4,272,160 A * 6/1981 Uesugi ........................ 359/700
5,161,066 A * 11/1992 Tanaka et al. ............... 359/823
5,225,938 A * 7/1993 Nomura ...................... 359/699

* cited by examiner

Primary Examiner—Ricky Mack
(74) Attorney, Agent, or Firm—Birch, Stewart, Kolasch, & Birch, LLP

(57) ABSTRACT

Guide grooves are formed on the inner periphery of a first lens barrel along an optical axis, and guide couplers are coupled with the guide grooves to guide the first lens barrel along the optical axis. Inclined parts are formed on both sides of the guide grooves, and inclined parts are formed on both sides of the guide couplers. Thus, the guide couplers do not easily come off from the guide grooves even if a pressure is applied to them.

18 Claims, 17 Drawing Sheets

F I G. 1
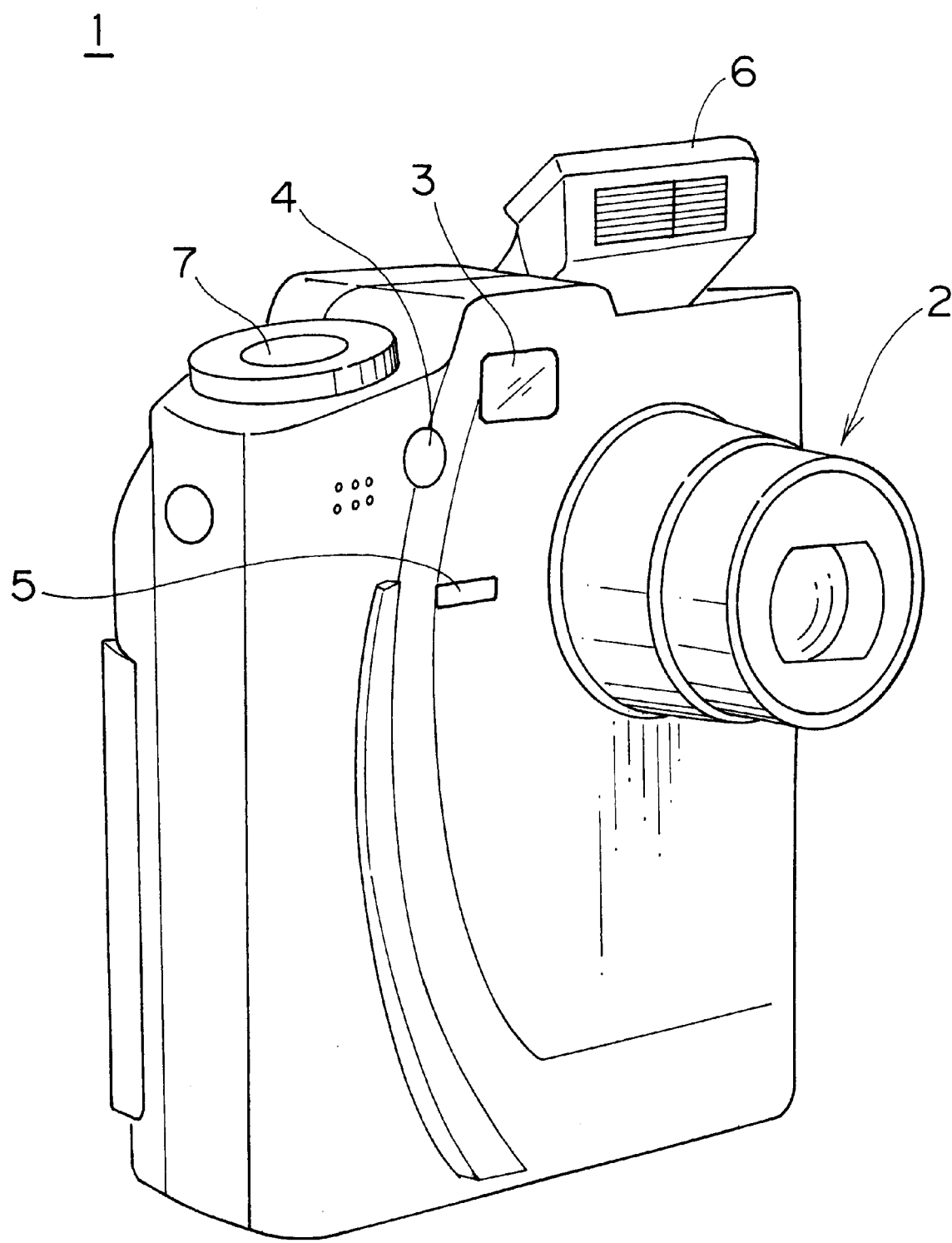

F I G. 1 6
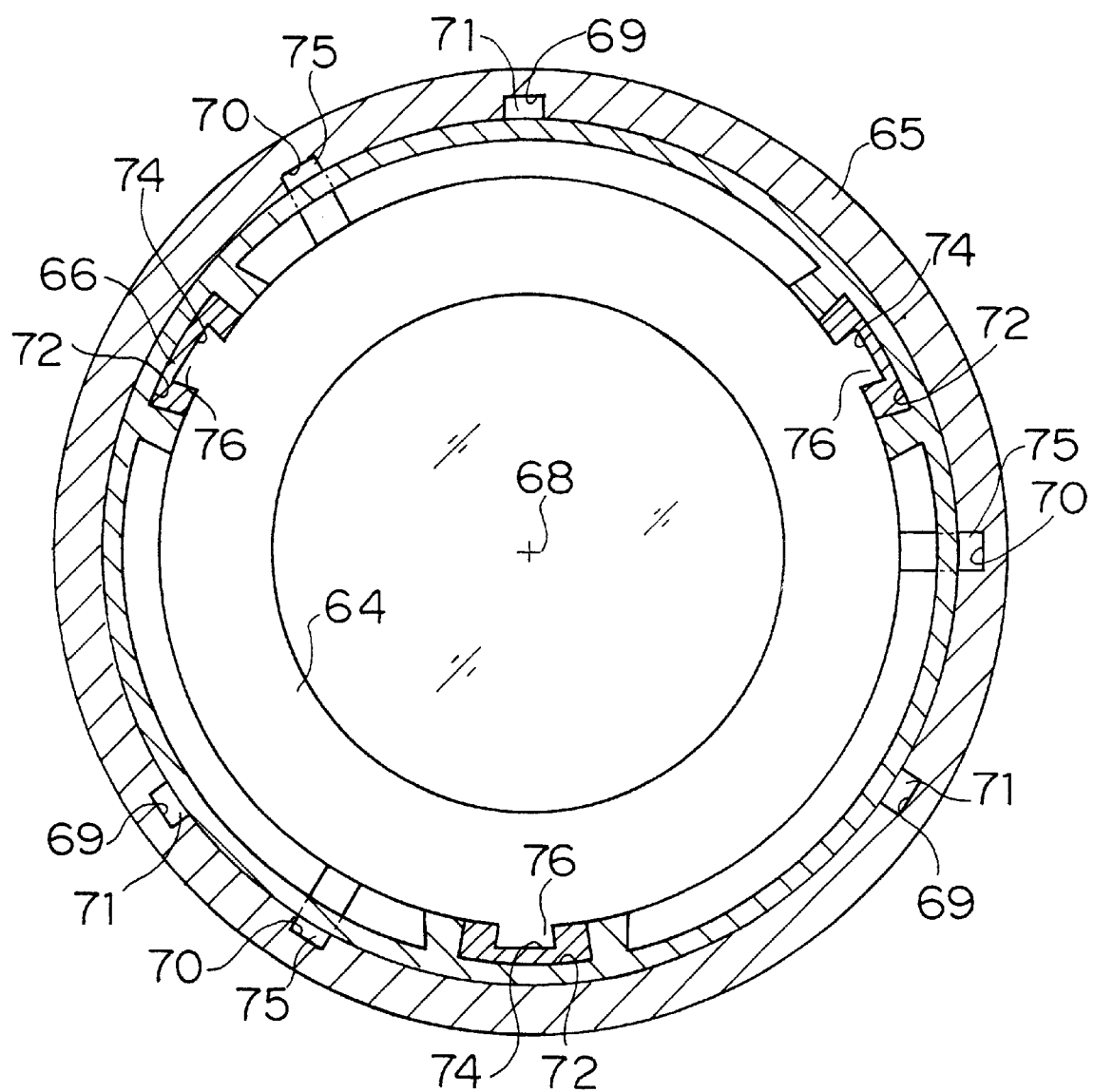

LENS DEVICE

BACKGROUND OF THE INVENTION

1. Field of the Invention

The present invention relates generally to a lens device, and more particularly to a lens device that can be collapsed for a camera with a zooming function.

2. Description of Related Art

A cam mechanism is used to move a lens barrel along an optical axis. The cam mechanism is composed of cam followers formed on the outer periphery of the lens barrel, cam grooves formed on the inner periphery of a rotatable barrel to couple with the cam follower, and guides that prevent rotation of the lens barrel and guide it along the optical axis. Rotation of the rotatable barrel moves the lens barrel along the optical axis due to the cam grooves.

An example of the guides is a fixed barrel with guide slits along the optical axis, and the cam followers are coupled with the guide slits. Another example of the guides is guide bars along the optical axis and sliders formed on the lens barrel, and the sliders are coupled with the guide bars. The applicant of this invention has already proposed a guide method (Japanese Patent Application No. 11-280316). In the guide method, guide grooves are formed on the inner periphery of a first lens barrel, and arms extend from the front of a second lens barrel, and couplers are arranged at the ends of the arms to couple with the guide grooves.

In the guide method, however, if the camera is dropped and a pressure is applied to the arms and the guide grooves, the couplers come off from the guide grooves. Recently, the first lens barrel became thinner and the guide grooves became shallower to make the lens device small in size. Therefore, the couplers easily come off from the guide grooves even if a slight pressure is applied to them.

SUMMARY OF THE INVENTION

It is therefore an object of the present invention to provide a lens device which can prevent a guide member from coming off from a guide groove with a simple structure.

The above object can be achieved by providing a lens device comprising: a lens barrel that holds a lens and has a guide groove formed on a periphery of the lens barrel along an optical axis, and a guide member that is coupled with the guide groove to guide the lens barrel along the optical axis; wherein a bottom part of the guide groove is wider than an opening part of the guide groove, and a top part of the guide member is wider than a base part of the guide member.

The above object can be achieved by providing a lens device comprising: a lens barrel that holds a lens, an arm member that is provided along an optical axis and has a guide groove formed on a periphery of the arm member along the optical axis, and a guide member that is coupled with the guide groove to guide the lens barrel along the optical axis; wherein a bottom part of the guide groove is wider than an opening part of the guide groove, and a top part of the guide member is wider than a base part of the guide member.

According to the present invention, the bottom part of the guide groove is wider than the opening part, and the top part of the guide member is wider than the base part. Thus, the guide member does not easily come off from the guide groove even if a pressure is applied to them.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view showing the appearance of an electronic still camera;

FIG. 12 is an explanatory drawing showing loci of the first lens barrel, the second lens barrel, the movable barrel and so on;

FIG. 16 is a vertical section of the lens device of the second embodiment of the present invention.

DETAILED DESCRIPTION OF THE PREFERRED EMBODIMENT

Figure 2:
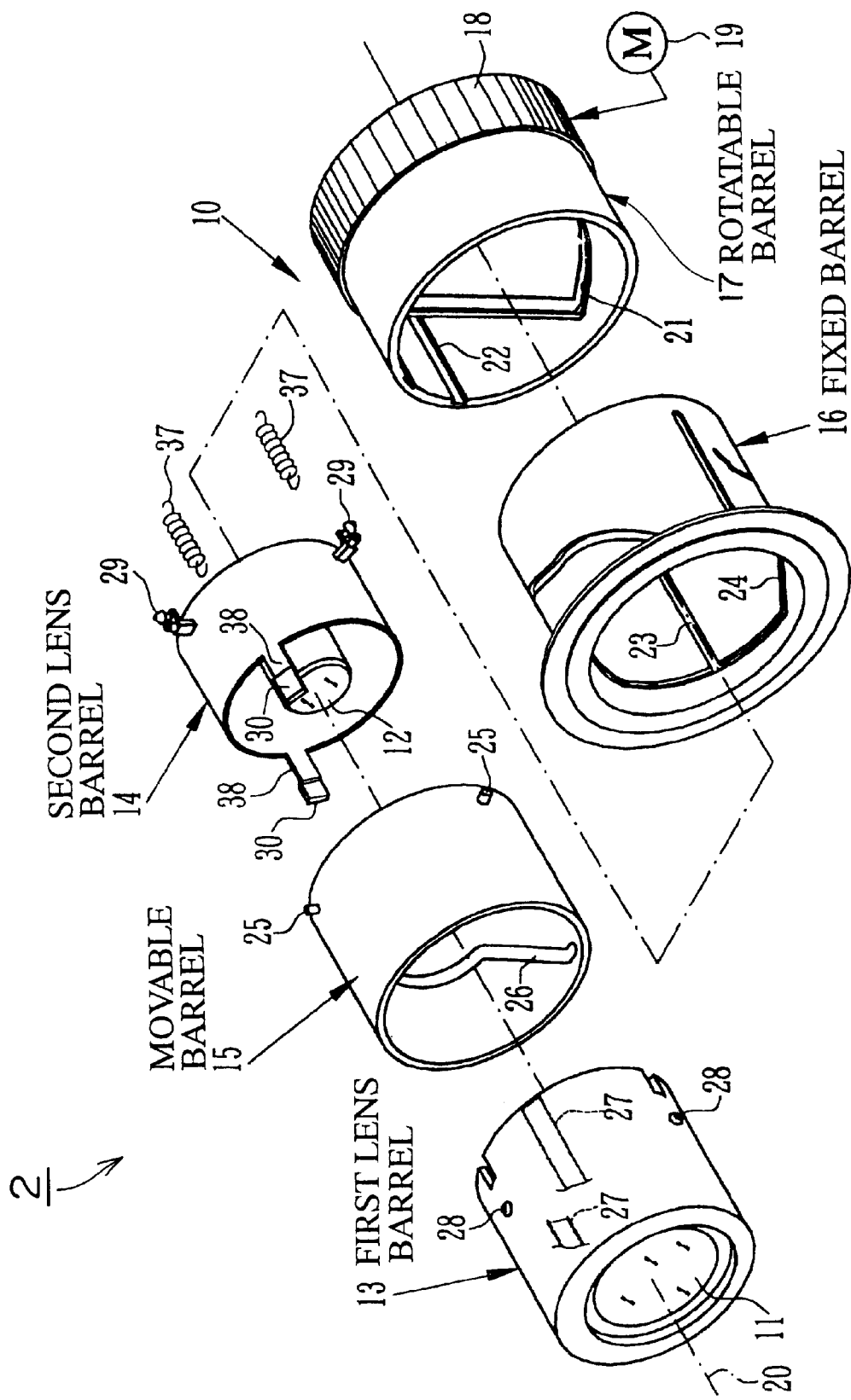
FIG. 2 is a disassembly perspective view of a lens device of a first embodiment of the present invention.

This invention will be described in further detail by way of example with reference to the accompanying drawings.

FIG. 1 is a perspective view showing the appearance of an electronic still camera 1 to which a lens device 2 according to the present invention is applied.

As shown in FIG. 1, the body of the electronic still camera 1 is shaped like a rectangular box, and the lens device 2, a viewfinder window 3, an electronic flash light-adjusting sensor 4, a self-timer indicator 5, etc. are arranged on the front of the camera body. A retractable electronic flash 6 and a shutter release button 7 are provided on the top of the camera body. An eyepiece, a liquid crystal panel, control keys (not shown) and so on are arranged on the back of the camera body. The lens device 2 can be collapsed, and it comes out of the front of the camera body only when the camera 1 is to be used.

Figure 3:
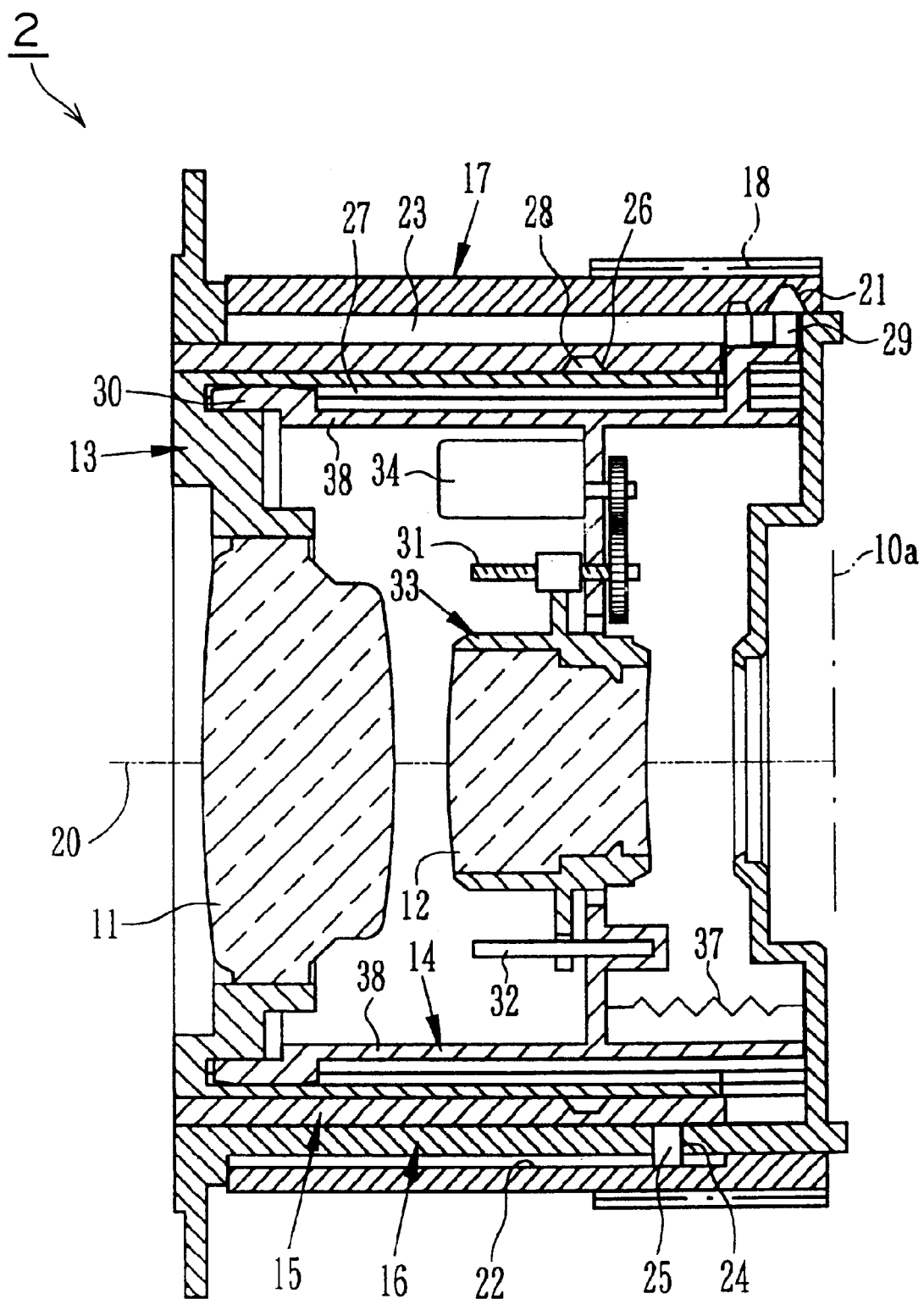
FIG. 3 is a cross section of the lens device at a collapsed position.
Figure 4:
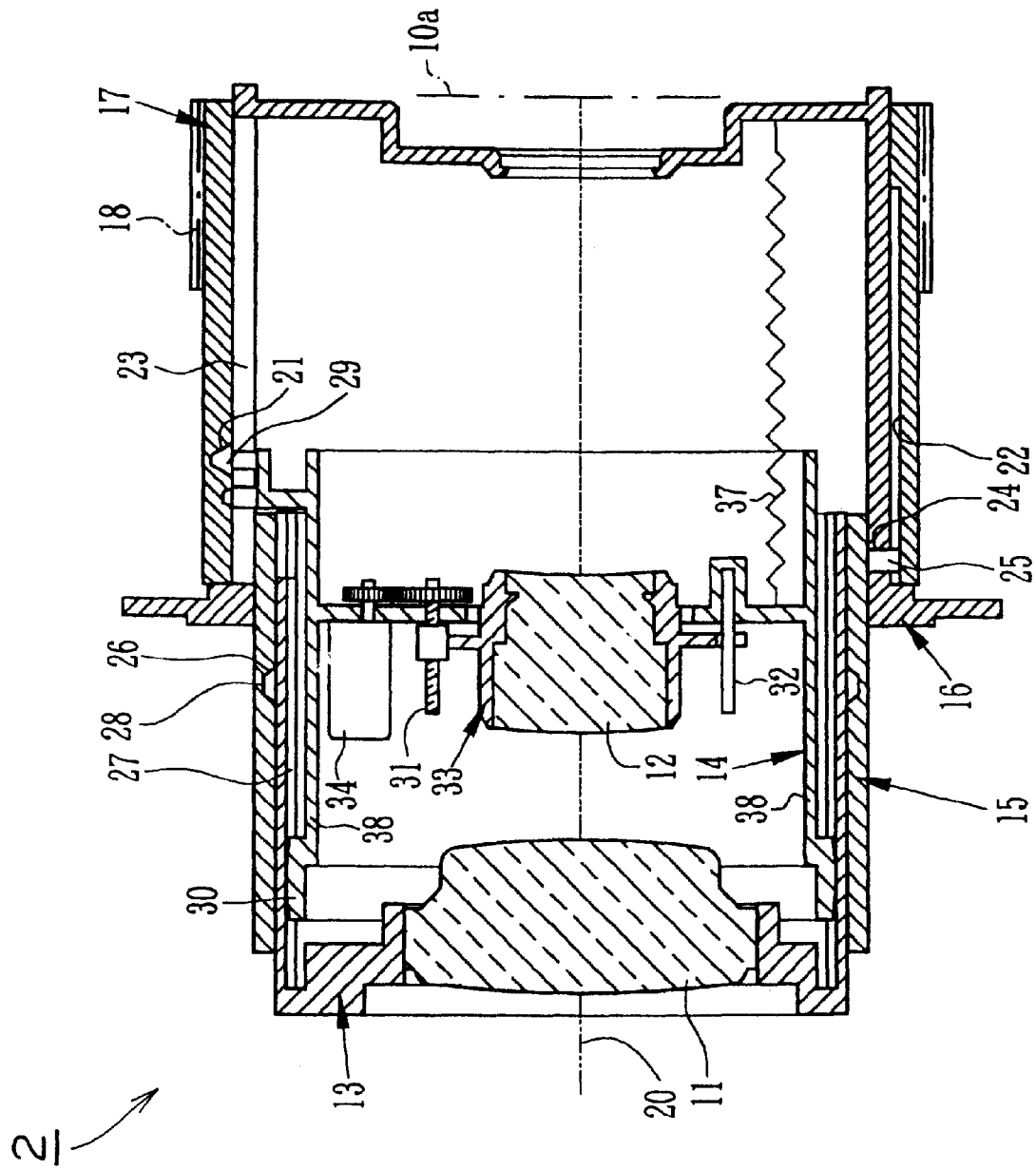
FIG. 4 is a cross section of the lens device at a telephoto position.
Figure 5:
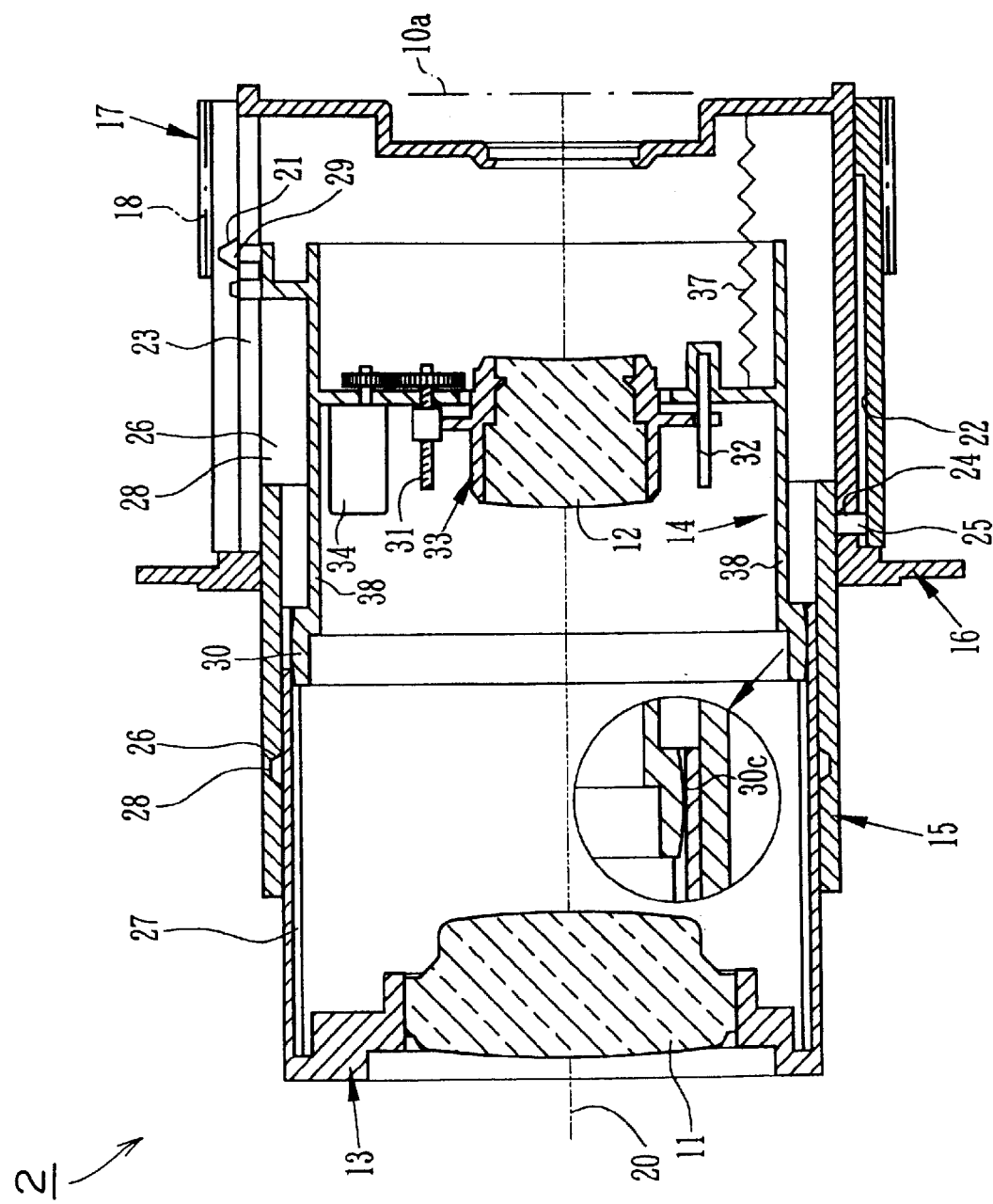
FIG. 5 is a cross section of the lens device at a wide-angle position.

FIG. 2 is a disassembly perspective view of the lens device 2, and FIGS. 3, 4 and 5 are cross sections of the lens device 2. FIG. 3 shows the lens device 2 at a collapsed position, and FIG. 4 shows the lens device 2 at a telephoto position, and FIG. 5 shows the lens device 2 at a wide-angle position.

As shown in FIGS. 2–5, the lens device 2 is composed of a first lens 11, a second lens 12, a first lens barrel 13, a second lens barrel 14, a movable barrel 15, a fixed barrel 16 and a rotatable barrel 17.

A gear part 18 is formed on the outer periphery of the rotatable barrel 17. Driving force of a zoom motor 19 is transmitted to the gear part 18, and this rotates the rotatable barrel 17 which comes in contact with the outer periphery of the fixed barrel 16.

The lens device 2 moves from the collapsed position in FIG. 3 and the telephoto position in FIG. 4 while the rotatable barrel 17 rotates within a "collapsed area" between an "initial position" and a "middle position." The lens device 2 moves from the telephoto position in FIG. 4 to the wide-angle position in FIG. 5 while the rotatable barrel 17 rotates within a "zoom area" between the "middle position" and an "end position."

Three cam groove parts 21 for moving the second lens barrel 14 along an optical axis 20 and three guide grooves 22 for guiding the moving barrel 15 along the optical axis 20 are formed on the inner periphery of the rotatable barrel 17. The cam groove parts 21 and the guide grooves 22 are arranged at regular intervals, respectively.

Three guide slits 23 for guiding the second lens barrel 14 along the optical axis 20 and three cam slits 24 for moving the movable barrel 15 along the optical axis 20 are formed in the periphery of the fixed barrel 16. The guide slits 23 and the cam slits 24 are arranged at regular intervals, respectively.

Three cam followers 25 are arranged on the outer periphery of the movable barrel 15 at regular intervals, and they are coupled with the cam slits 24 of the fixed barrel 16 and the guide grooves 22 of the rotatable barrel 17. The rotation of the rotatable barrel 17 rotates the movable barrel 15 and moves the movable barrel 15 along the optical axis 20 with respect to the fixed barrel 16 due to the cam slits 24 and the guide grooves 22.

Three cam grooves 26 for moving the first lens barrel 13 along the optical axis 20 are formed on the inner periphery of the movable barrel 15 at regular intervals.

Figure 6:
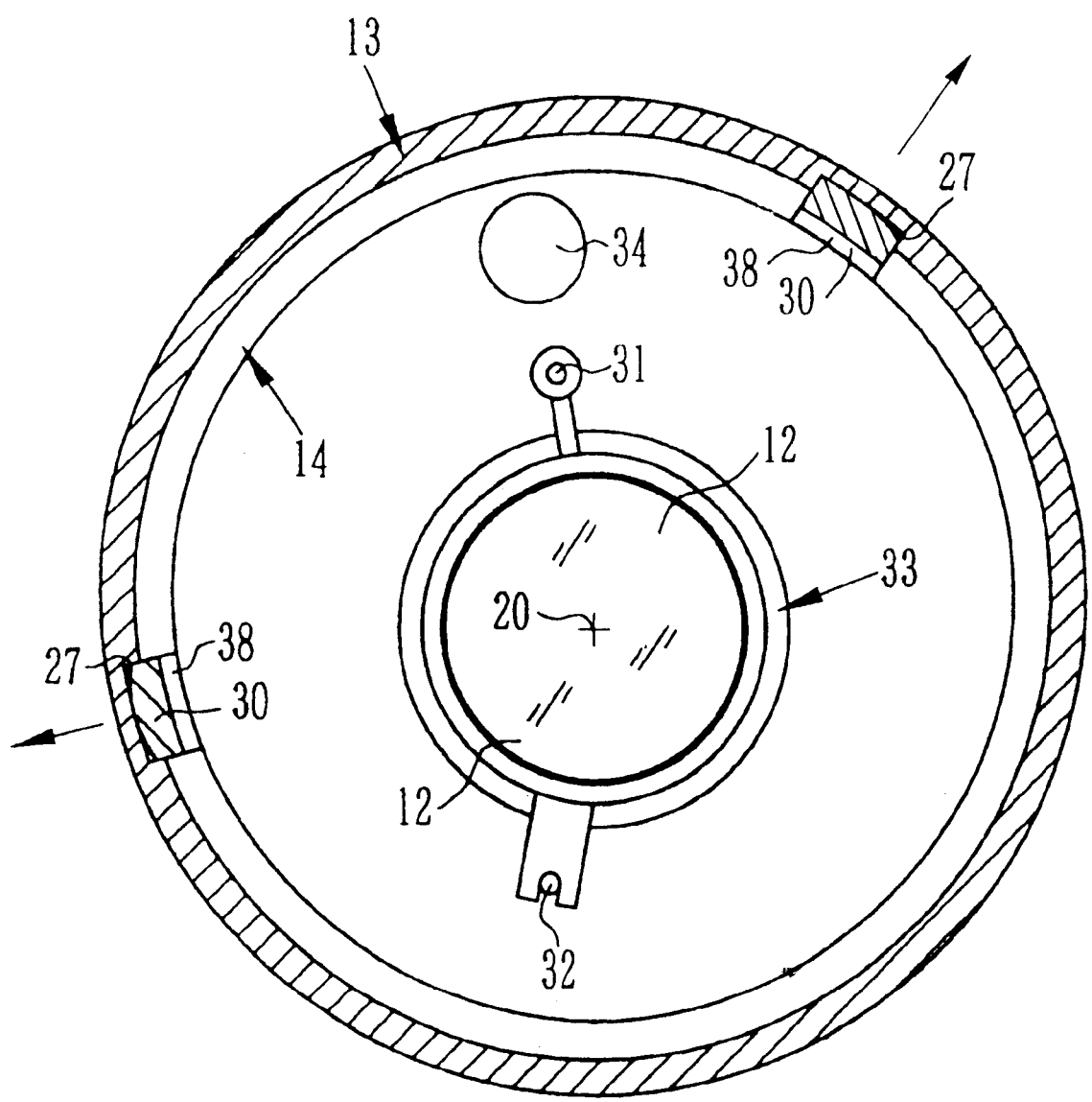
FIG. 6 is a vertical section of a first lens barrel and a second lens barrel.

Two guide grooves 27 are formed on the inner periphery of the first lens barrel 13 along the optical axis 20. The guide grooves 27 are coupled with guide couplers 30 of the second lens barrel 14 as shown in FIG. 6.

Three cam followers 28 are formed on the outer periphery of the first lens barrel 13 at regular intervals, and they are coupled with the cam grooves 26 formed on the inner periphery of the movable barrel 15. The rotation of the movable barrel 15 moves the first lens barrel 13 along the optical axis 20 with respect to the movable barrel 15 due to the cam grooves 26 and guides of the second lens barrel 14.

The first lens 11 is held at the end of the inner periphery of the first lens barrel 13, and it moves along with the first lens barrel 13.

Three cam follower parts 29 are arranged on the outer periphery of the second lens barrel 14 at regular intervals, and they are coupled with the cam groove parts 21 and the guide slits 23. The rotation of the rotatable barrel 17 moves the second lens barrel 14 along the optical axis 20 with respect to the fixed barrel 16 due to the cam groove parts 21 and the guide slits 23.

A pair of springs 37 is provided between the second lens barrel 14 and the fixed barrel 16 at regular intervals to force the second lens barrel 14 toward an image-forming surface.

A pair of arms 38 extends from the front end of the second lens barrel 14 at a predetermined interval, and the guide couplers 30 are formed on the outer periphery of the end of the arms 38. The guide couplers 30 are coupled with the guide grooves 27 formed on the inner periphery of the first lens barrel 13, and the first lens barrel 13 is guided along the optical axis with respect to the second lens barrel 14 due to the guide couplers 30 and the guide grooves 27.

Figure 7:
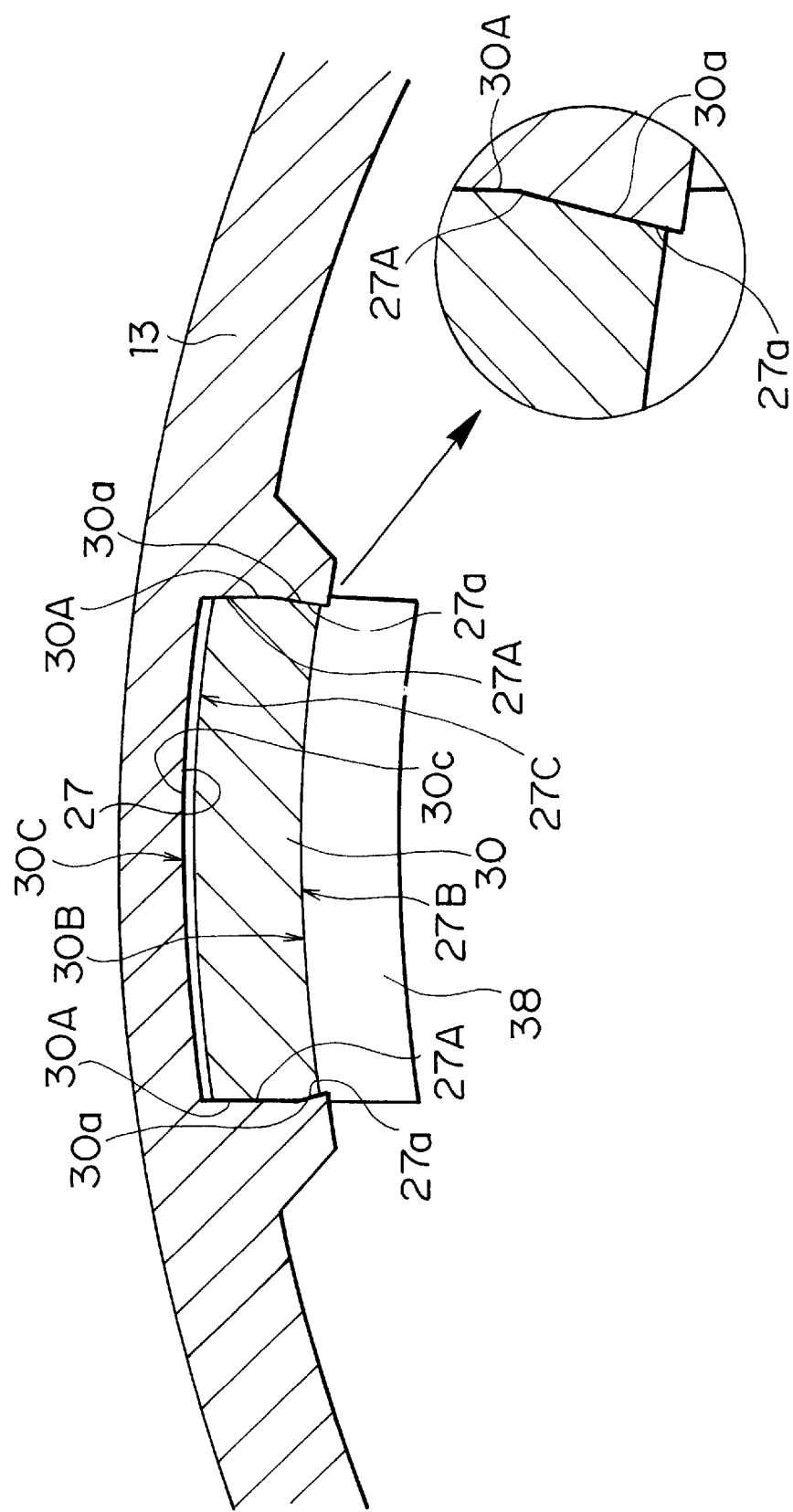
FIG. 7 is a section of a guide groove and a guide coupler that are coupled with each other.

As shown in FIG. 7, each guide coupler 30 is formed to fit with each guide groove 27. When the guide coupler 30 is engaged with the guide groove 27, both sides 30A of the guide coupler 30 are in contact with both sides 27A of the guide groove 27.

Inclined parts 27a are formed on both sides 27A at an opening part 27B of the guide groove 27, and inclined parts 30a are formed on both sides 30A at a base part 30B of the guide coupler 30 to make the base part 30B narrow.

A bottom part 27C of the guide groove 27 is wider than the opening part 27B, and a top part 30C of the guide coupler 30 is wider than the base part 30B. The guide coupler 30 and the guide groove 27 are coupled with each other to guide the first lens barrel 13 and the second lens barrel 14, and thus the guide coupler 30 does not easily come off from the guide groove 27 due to the inclined parts 27a and 30a even if a pressure is applied to them.

The second lens barrel 14 is made from elastic material such as plastic with a metal mold, and the arms 38 are formed so that the top parts 30C of the guide couplers 30 push the bottom parts 27C of the guide grooves 27 when the guide couplers 30 are coupled with the guide grooves 27. Thus, the first lens barrel 13 is supported by the second lens barrel 14 so as not to tilt with respect to the second lens barrel 14.

The top surface 30c of the guide coupler 30 is shaped like a hemisphere to reduce resistance caused by the sliding. The section of the top surface 30a along the optical axis 20 is shaped like an ark, and the section of it along a plane that is perpendicular to the optical axis 20 is shaped like an ark. This makes the relative movement of the first lens barrel 13 and the second lens barrel 14 and the rotation of the rotatable barrel 17 smooth.

The second lens 12 can move along the optical axis 20 in the second lens barrel 14. As shown in FIGS. 3–5, the second lens 12 is held by a second lens frame 33 provided in the second lens barrel 14, and the second lens frame 33 supports the second lens 12 with a feed screw 31 and a guide bar 32 so that the second lens can move along the optical axis 20 in the second lens barrel 14. The feed screw 31 is connected to an output shaft of a focus motor 34 and driven by the focus motor 34. Rotation of the feed screw 31 moves the second lens 12 along the optical axis 20.

The second lens 12 moves between an "origin position" that is the closest to the image-forming surface 10a and another position that is farther from the image-forming surface 10a. The second lens 12 is at the origin position at the zooming.

Figure 8:
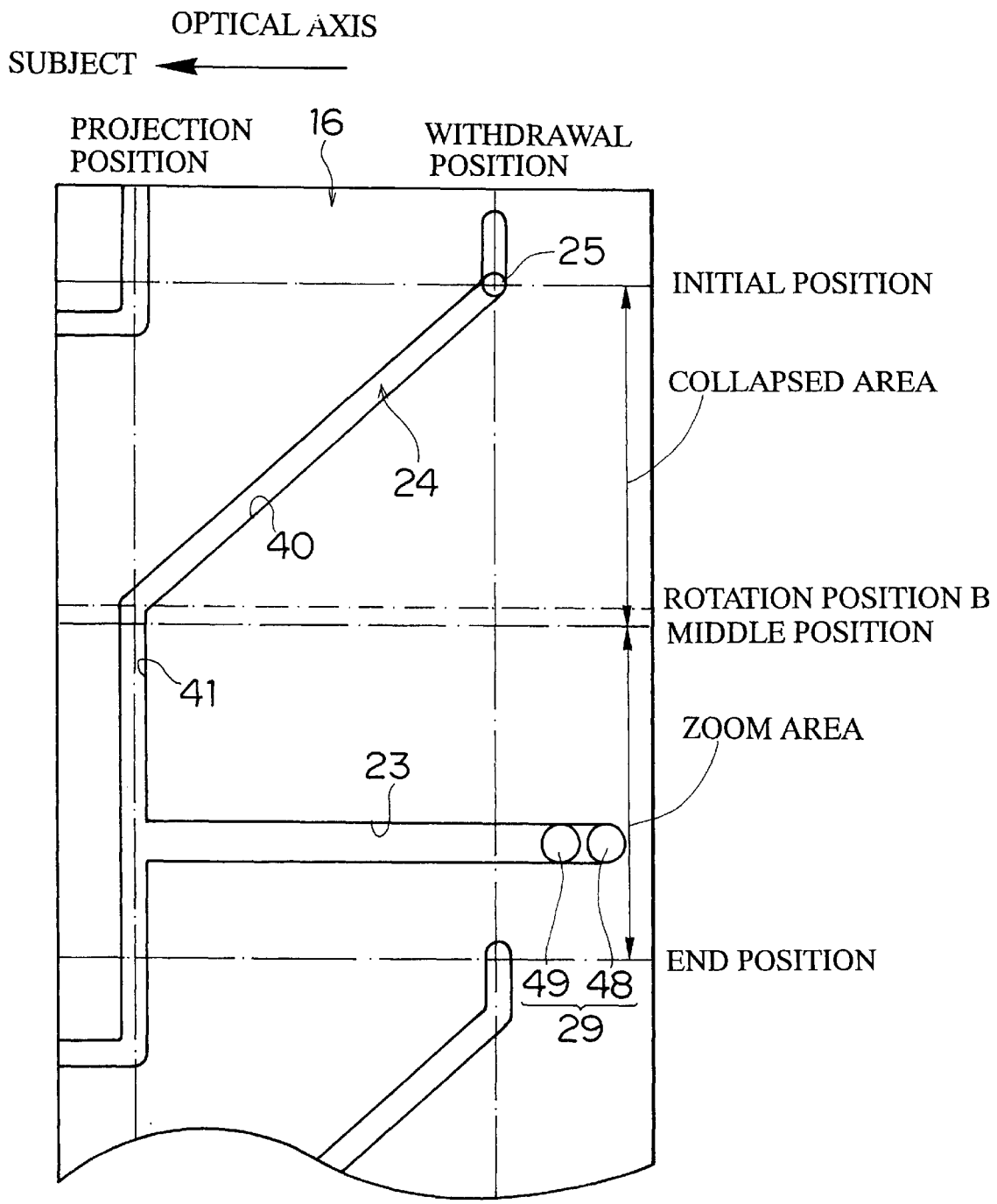
FIG. 8 is a development showing a cam slit of a fixed barrel.

FIG. 8 is a development showing the structure of the cam slits 24 of the fixed barrel 16. Each cam slit 24 is composed of a collapsed area guide 40 and a movable barrel stopper 41.

The cam follower 25 slides along the collapsed area guide 40 when the rotatable barrel 17 rotates within the "collapsed area," and the collapsed area guide 40 moves the movable barrel 15 between a "withdrawal position" and a "projection position" that is closer to the subject than the "withdrawal position" with respect to the fixed barrel 16. When the movable barrel 15 is at the "withdrawal position," the lens device 2 is at the collapsed position.

The cam follower 25 slides along the movable barrel stopper 41 when the rotatable barrel 17 rotates within the "zoom area," and it is shaped like an ark around the optical axis 20 so that it allows the movable barrel 15 to rotate about the optical axis 20 and does not allow the movable barrel 15 to move along the optical axis 20. The movable barrel 15 is at the "projection position" when the lens device 2 is zoomed between the telephoto position and the wide-angle position.

Figure 9:
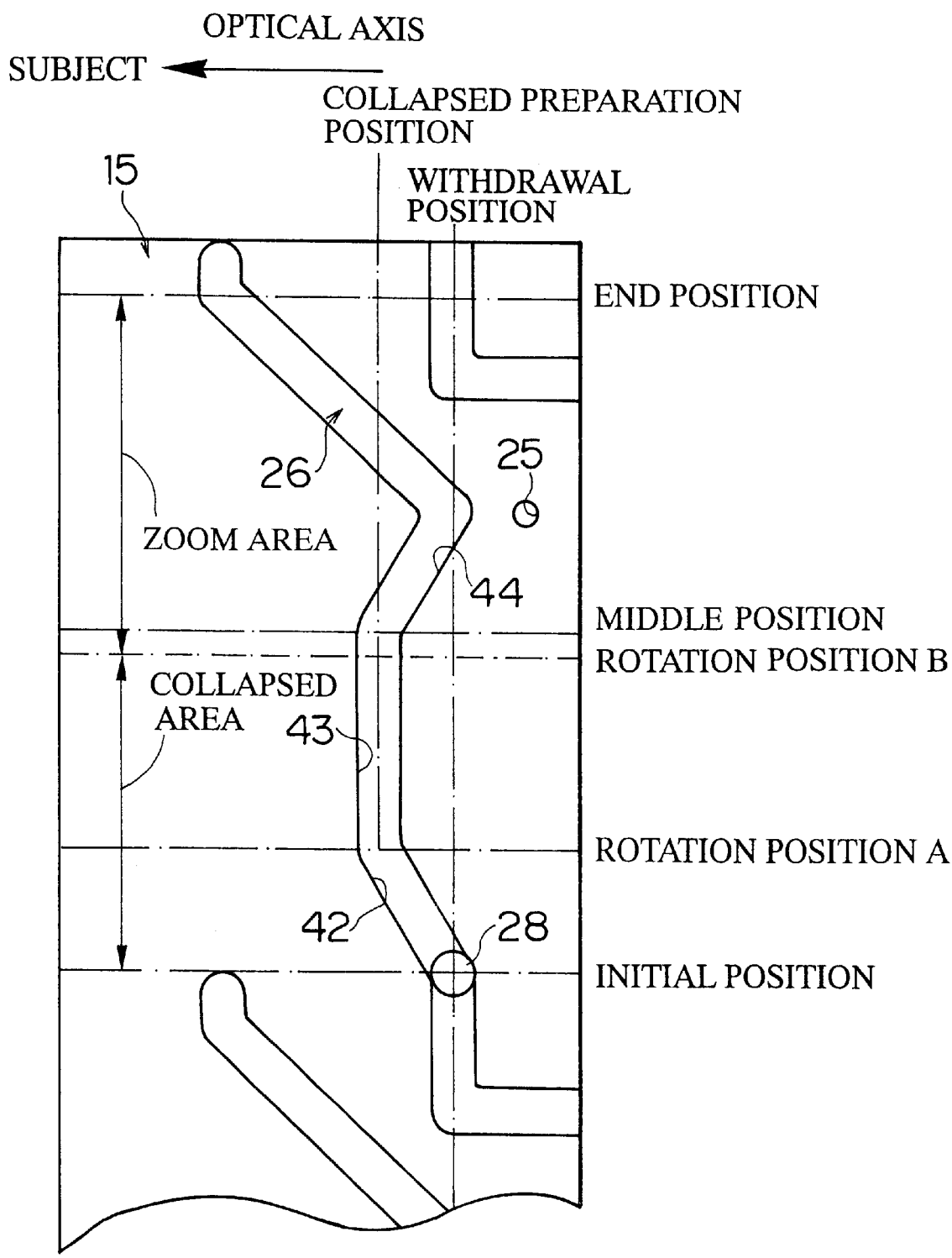
FIG. 9 is a development showing a cam groove of a movable barrel.

FIG. 9 is a development showing the structure of the cam grooves 26 of the movable barrel 15. Each cam slit 24 is composed of a collapsed preparation guide 42, a first lens stopper 43 and a zoom guide 44.

The cam follower 28 slides along the collapsed preparation guide 42 when the rotatable barrel 17 rotates within a rotation area between the "initial position" and a "rotation position A" that is between the "initial position" and the "middle position." The collapsed preparation guide 42 moves the cam follower 28 between the "withdrawal position" and a "collapsed preparation position" that is a little closer to the subject than the "withdrawal position." When the first lens barrel 13 is at the "withdrawal position," the lens device 2 is at the collapsed position.

The cam follower 28 slides along the first lens stopper 43 when the rotatable barrel 17 rotates within the "collapsed area." The first lens stopper 43 is shaped like an ark around the optical axis 20 so that it allows the movable barrel 15 to rotate and does not allow the first lens barrel 13 along the optical axis 20 from the "collapsed preparation position." The first lens barrel 13 is kept at the "collapsed preparation position" until the lens device 2 is moved from the collapsed position to the telephoto position. The first lens stopper 43 keeps the first lens barrel 13 at the "collapsed preparation position" when the rotatable barrel 17 rotates from the "rotation position A" to the "middle position."

The cam follower 28 slides along the zoom guide 44 when the rotatable barrel 17 rotates within the "zoom area." The zoom guide 44 moves the first lens barrel 13 along the optical axis 20 to change the focal length. The collapsed preparation guide 42 is not necessarily formed, and the first lens stopper 43 may extend so that the cam follower 28 slides along the entire first lens stopper 43 when the rotatable barrel 17 rotates within the "collapsed area."

Figure 10:
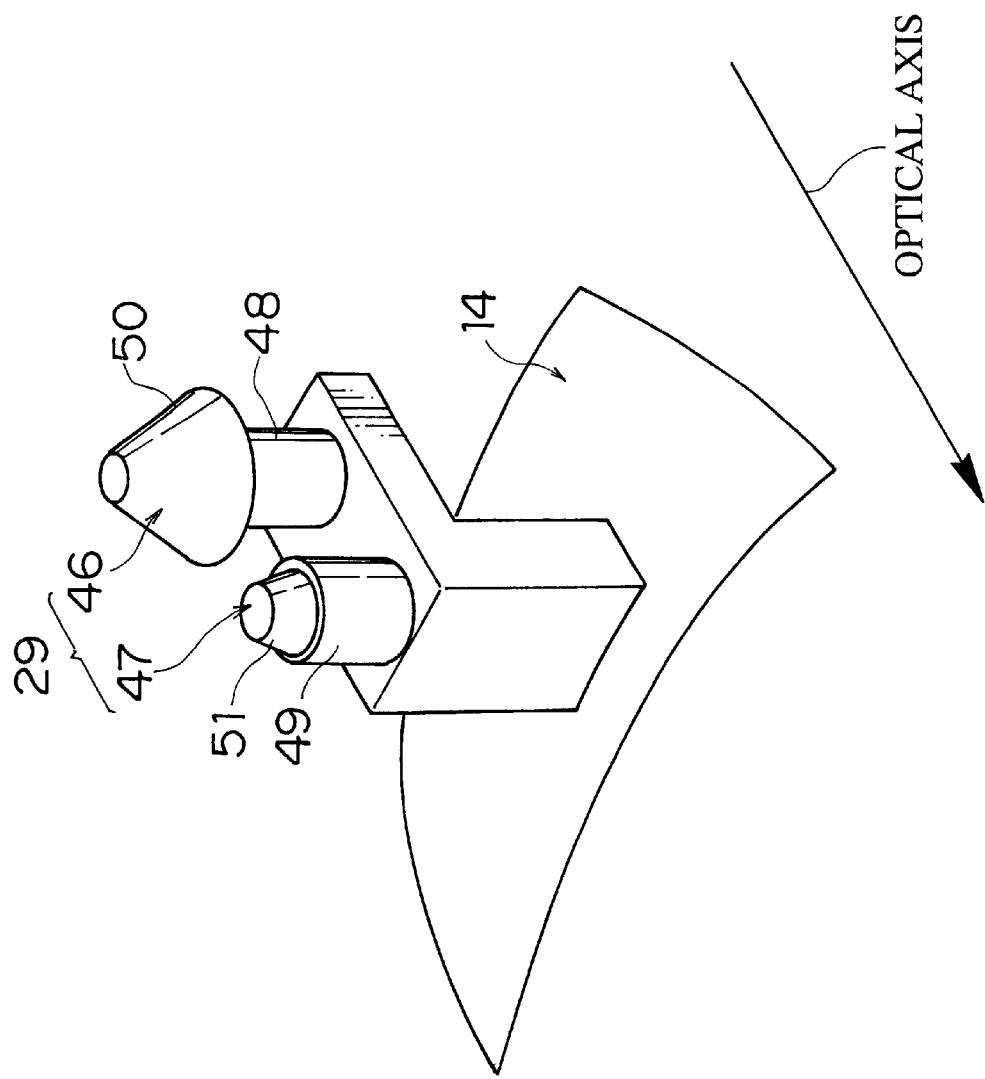
FIG. 10 is a perspective view of a cam follower part.

FIG. 10 is a perspective view of the cam follower part 29. The cam follower part 29 is composed of a main cam follower 46 and a sub-cam follower 47.

The main cam follower 46 has a first coupler 48 and a second coupler 50, and the sub-cam follower 47 has a first coupler 49 and a second coupler 51. The first couplers 48 and 49 have the same diameter to be coupled with the guide slit 23. The second couplers 50 and 51 are truncated cones, and the diameter of the second coupler 50 is larger than that of the second coupler 51. Since at least one of the first couplers 48 and 49 needs to be coupled with the guide slit 23, the diameter of one of them may be smaller.

Figure 11:
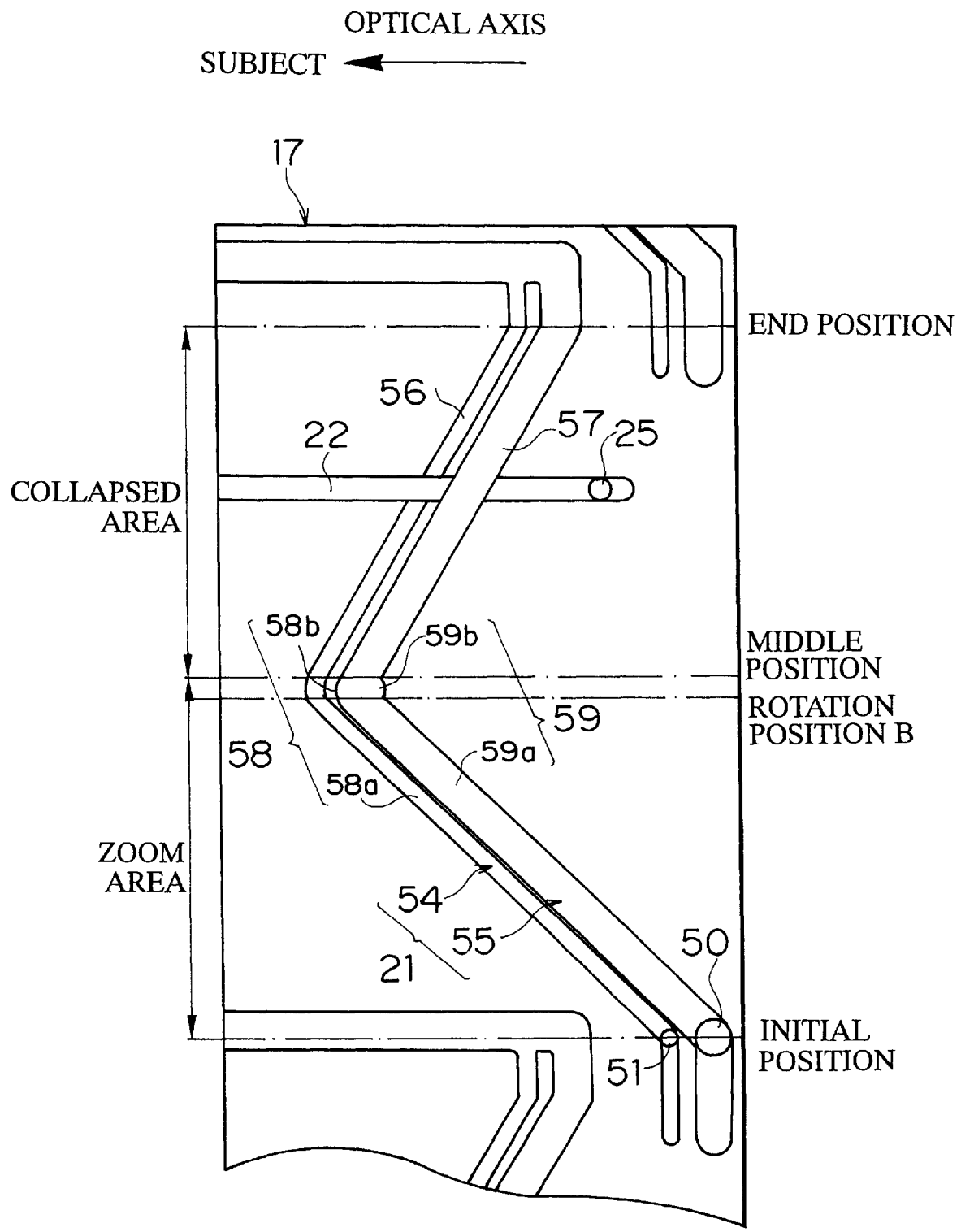
FIG. 11 is a development showing a cam groove part of a rotatable barrel.

FIG. 11 is a development showing the structure of the cam groove parts 21 of the rotatable barrel 17. Each cam groove part 21 is composed of a sub-cam groove 54 and a main cam groove 55.

The second coupler 51 of the sub-cam follower 47 is inserted in the sub-cam groove 54, and the second coupler 50 of the main cam follower 46 is inserted in the main cam groove 55. The sub cam groove 54 is composed of a zoom guide 56 and a collapsed area guide 58, and the main cam groove 55 is composed of a zoom guide 57 and a collapsed area guide 59. The zoom guides 56 and 57 move the second lens 12 along the optical axis 20 to change the focal length, and the collapsed area guides 58 and 59 move the second lens 12 to collapse it.

The zoom guides 56 and 57 move the second lens barrel 14 toward the image-forming surface when the rotatable barrel 17 rotates toward the "end position" within the "zoom area."

The collapsed area guide 58 is composed of a straight part 58a and a bent part 58b, and the collapsed area guide 59 is composed of a straight part 59a and a bent part 59b.

The straight parts 58a and 59a are straight to guide the second lens barrel 14 toward the subject when the rotatable barrel 17 rotates within the area between the "initial position" and a "rotation position B" toward the "middle position."

The bent parts 58b and 59b are bent to change the moving direction of the second lens barrel 14 when the rotatable barrel 17 rotates within the area between the "rotation position B" and the "middle position" toward the "middle position."

The loci of the main cam follower 46 and the sub-cam follower 47 at the bent parts 58b and 59b are convex toward the subject, and the radius of curvature of the image-forming surface side locus of the main cam follower 46 is smaller than that of the image-forming surface side locus of the sub-cam follower 47 since the diameter of the second coupler 51 is smaller than that of the second coupler 50.

The bent part 58b is as wide as the second coupler 51 of the sub-cam follower 47, and the other parts of the sub-cam groove 54 are wider than the second coupler 51. Thus, the second coupler 51 is coupled with the bent part 58b, and it is not coupled with the other parts of the sub-cam groove 54.

The bent part 59b is wider than the second coupler 50 of the main cam follower 46, and the other parts of the main cam groove 55 are as wide as the second coupler 50. Thus, the second coupler is not coupled with the bent part 59b, and it is coupled with the other parts. The second lens barrel 14 can smoothly move since the radius of curvature of the bent part 58b is large.

The operation of the lens device 2 will now be explained.

As shown in FIG. 3, when the lens device 2 is at the collapsed position, the movable barrel 15 and the first lens barrel 13 are in the fixed barrel 16.

When the zoom motor 19 is driven to rotate the rotatable barrel 17 from the "initial position" and the "end position," the driving force is transmitted to the cam follower 25 through the guide groove 22. This rotates the movable barrel 15 together with the rotatable barrel 15.

Since the cam followers 25 of the movable barrel 15 are coupled with the guide groove 22 of the rotatable barrel 17 and the cam slit 24 of the fixed barrel 16, the movable barrel 15 moves along the optical axis 20 while rotating.

Since the cam followers 28 of the first lens barrel 13 are coupled with the cam grooves 26 of the movable barrel 15 and the guide grooves 27 of the first lens barrel 13 are coupled with the guide couplers 30 of the second lens barrel 14, the rotation of the movable barrel 15 moves the first lens barrel 13 along the optical axis 20 with respect to the movable barrel 16.

Since the main cam followers 46 of the second lens barrel 14 are coupled with the guide slit 23 and the main cam grooves 55, the rotation of the rotatable barrel 17 moves the second lens barrel 14 along the optical axis 20 together with the rotational barrel 14.

Figure 12:
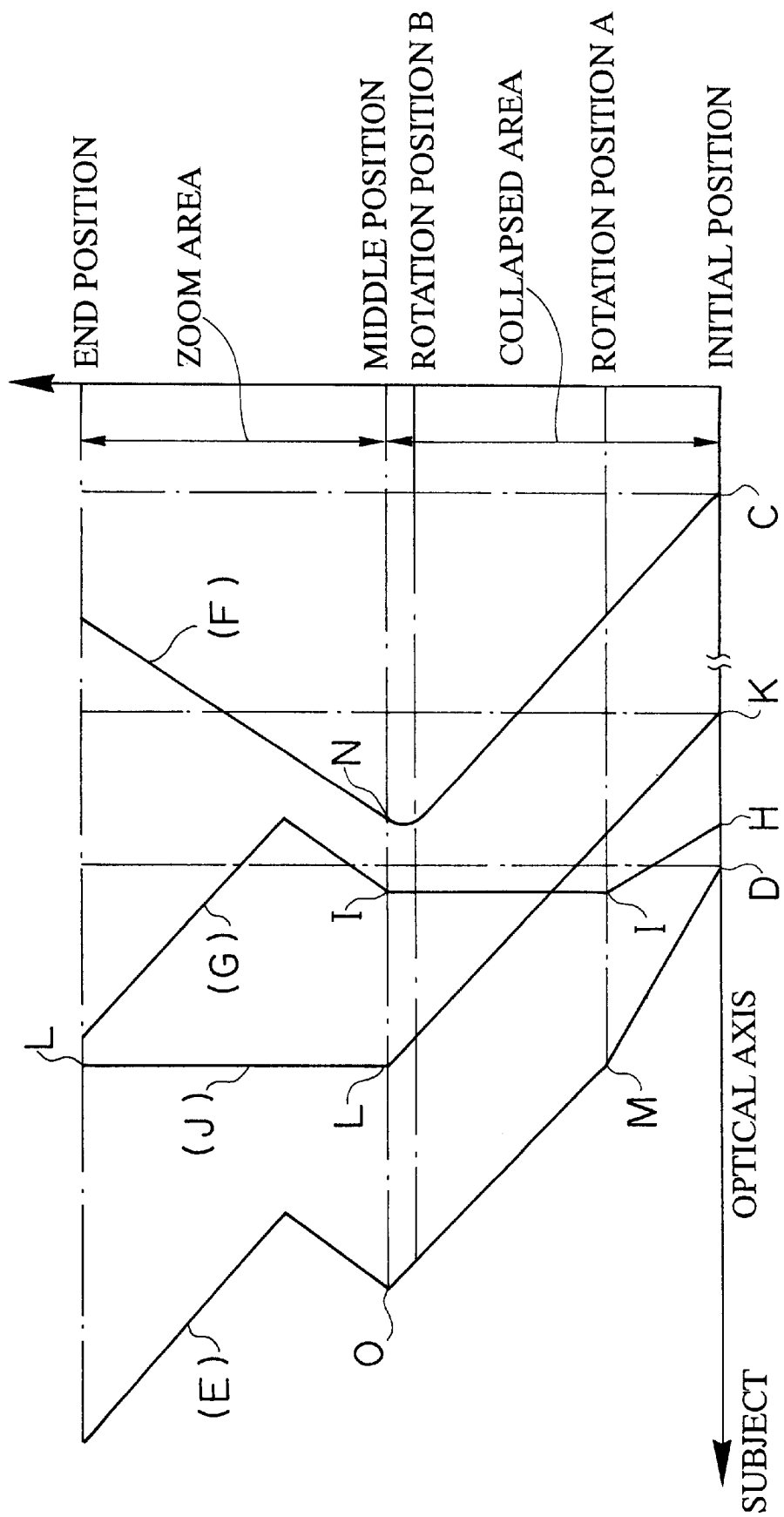

FIG. 12 is an explanatory drawing showing loci of the first lens barrel 13, the second lens barrel 14, the movable barrel 15 and so on.

In FIG. 12, the thick line (E) shows the locus of the first lens barrel 13, and the thick line (F) shows the locus of the second lens barrel 14, and the thin line (G) shows the locus of the first lens barrel 13 with respect to the movable barrel 15, and the thin line (J) shows the locus of the movable barrel 15 of the movable barrel 15.

When the rotatable barrel 17 is at the collapsed position, the second lens barrel 14 is at a "collapsed position C" that is closest to the image-forming surface, and the first lens barrel 13 is at a "collapsed position D" that is closest to the second lens barrel 14.

While the rotatable barrel 17 rotates from the "initial position" to the "rotation position A," the cam followers 28 of the first lens barrel 13 slide along the collapsed preparation guides 42 of the cam grooves 26, and therefore the first lens barrel 13 moves from a "withdrawal position H" to a "collapsed preparation position I" with respect to the movable barrel 15.

In the meantime, the cam followers 25 of the movable barrel 15 slide along the collapsed area guides 40 of the cam slits 24, and therefore the movable barrel 15 moves from a "withdrawal position K" to a "project position L."

Since the first lens barrel 13 is supported by the movable barrel 15, the first lens barrel 13 moves from the "collapsed position D" to a position M along the optical axis 20, and the moving distance between the two positions is the total of the projecting amount of the movable barrel 15 and the distance between the "withdrawal position H" to the "collapsed preparation position I."

While the rotatable barrel 17 rotates from the "rotation position A" to the "middle position," the cam followers 28 slide along the first lens stoppers 43 of the cam grooves 26. In the meantime, the first lens barrel 13 can not move along the optical axis 20 with respect to the movable barrel 15, and thus it moves together with the movable barrel 15.

While the rotatable barrel 17 rotates from the "initial position" to the "rotation position B," the second lens barrel 14 is moved by the main cam followers 46 coupled with the main cam grooves 55.

When the rotatable barrel 17 comes to the "rotation position B," the second couplers 50 and 51 of the cam follower parts 29 are inserted in the bent parts 58a and 59a of the cam groove parts 21 of the rotatable barrel 17. At this time, the second couplers 50 are released from the coupling by the main cam grooves 55, and the second couplers 51 get coupled with the sub-cam grooves 54. Therefore, the second lens barrel 14 is moved by the sub-cam follower 47 coupled with the sub-cam grooves 54.

The radius of curvature of the image-forming surface side of the bent parts 58a of the sub-cam grooves 54 are larger than those of the image-forming surface side of the bent parts 59a of the main cam grooves 55. Therefore, the second lens barrel 14 can be smoothly moved, and the rotation load of the rotatable barrel 17 can be reduced.

While the rotatable barrel 17 is at the "middle position," the lens device is at the telephoto position as shown in FIG. 2. At this time, the movable barrel 15 is at the "projection position L" with respect to the fixed barrel 16.

While the rotatable barrel 17 rotates from the "rotation position A" to the "middle position," the first lens barrel 13 stays at the "collapsed preparation position I" with respect to the movable barrel 15. Therefore, the first lens barrel 13 moves along the optical axis 20 together with the movable barrel 15, and it is at a point O when the rotatable barrel 17 comes to the "middle position."

When the lens device 2 comes to the telephoto position, the second couplers 51 of the sub-cam followers 47 are released from the coupling by the sub-cam grooves 54, and the second couplers 50 of the main cam followers 46 get coupled with the main cam grooves 55. At this time, the second lens barrel 14 is at a position N.

While the rotatable barrel 17 rotates from the "rotation position A" to the "middle position," the first lens 11 held by the first lens barrel 13 can not move with respect to the movable barrel 15, and it moves together with the movable barrel 15.

After the lens device 2 comes to the telephoto position, the rotatable barrel 17 rotates within the "zoom area."

While the rotatable barrel 17 rotates within the "zoom area," the cam followers 25 of the movable barrel 15 slide along the movable barrel stoppers 41 of the cam slits 24, and thus the movable barrel 15 is kept at the "projection position L."

In the meanwhile, the cam followers 28 of the first lens barrel 13 slide along the zoom guides 44 of the cam grooves 26. Thus, the first lens barrel 13 is moved by the zoom guides 44 along the optical axis 20 with respect to the movable barrel 15.

The movable barrel 15 does not move with respect to the fixed barrel 16, and the first lens 11 held by the first lens barrel 13 is moved by only the movement of the first lens barrel 13 with respect to the movable barrel 15.

Meanwhile, the second couplers 50 of the second lens barrel 14 slide along the zoom guides 57 of the main cam grooves 55. Thus, the second lens barrel 14 is moved along the optical axis 20 by the zoom guides 57.

At the zooming, the first lens barrel 13 and the second lens barrel 14 move along the optical axis 20 to change the distance between them. The springs 37 forcing the second lens barrel 14 along the optical axis 20 firmly couple the cam follower parts 29 with the cam groove parts 21, and correct the tilt of the second lens barrel 14 with respect to the fixed barrel 16. The first lens barrel 13 are pressed by the guide couplers 30, and thus the first lens 11 does not tilt with respect to the second lens 12 at the zooming.

Since the force of the guide couplers 30 against the first lens barrel 13 is constant regardless of the position of the second lens barrel 14, the first lens barrel 13 and the second lens barrel 14 can be smoothly moved.

In addition, since the top surfaces 30c of the guide couplers 30 are shaped like hemispheres, a point of each top surface 30c contacts with the bottom part 27c of each guide groove 27. This reduces the resistance caused by the sliding.

The bottom parts 27C of the guide grooves 27 are wider than the opening parts 27B, and the top surfaces 30C of the guide couplers 30 are wider than the base parts 30B. Thus, the guide couplers 30 do not easily come off from the guide grooves 27 due to the inclined parts 27a and 30a even if the camera is dropped and the pressure is applied to the guide grooves 27 and the guide couplers 30.

For this reason, the lens device 2 of the embodiment can effectively prevent the guide couplers 30 from coming off from the guide grooves 27 with the simple structure.

Also, the guide grooves 27 do not have to be deepened and the guide couplers 30 do not have to be heightened, and thus the lens device 2 can be small.

Figure 13:
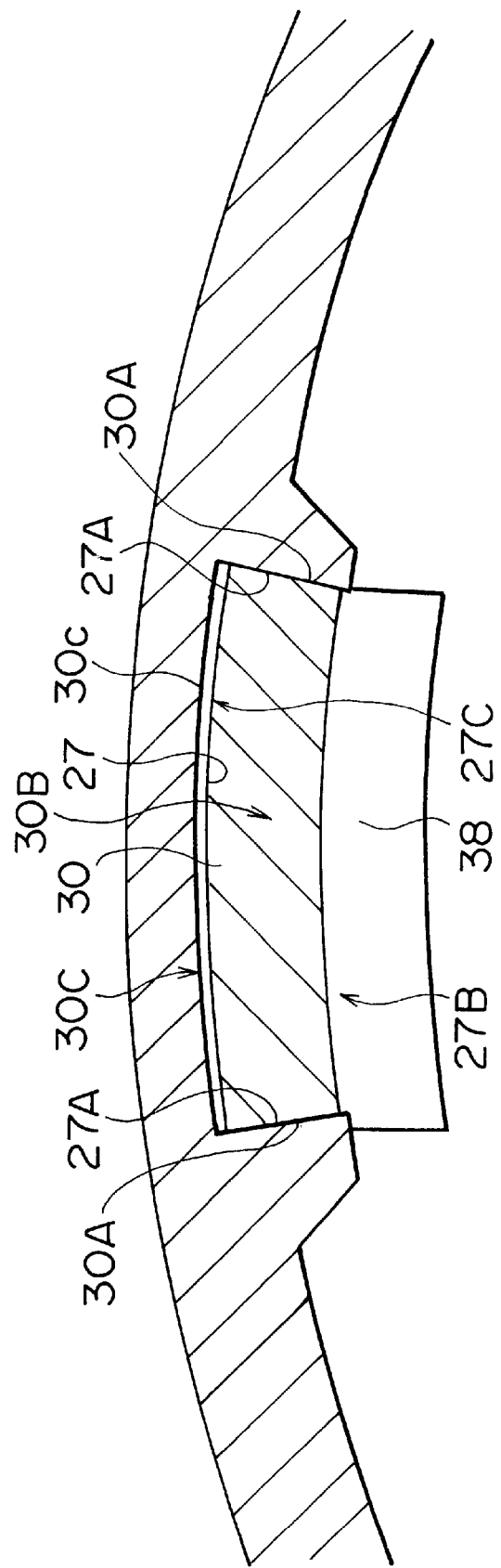
FIG. 13 is a section of a guide groove and a guide coupler of another embodiment.

The entire sides 27A of each guide groove 27 may be inclined as shown in FIG. 13. The bottom part 27C is wider than the opening part 27B, and the entire sides 30A of the guide coupler 30 are inclined.

The guide grooves 27 and the guide couplers 30 need to fit with each other so that they are firmly coupled with each other. In case only the parts of the sides of the guide grooves 27 and the guide couplers 30 are inclined, they can be easily made. In case the entire sides are inclined, it is difficult to make them since the first lens barrel 13 and the second lens barrel 14 are made from the material such as plastic with the metal mold as stated above.

Figure 14:
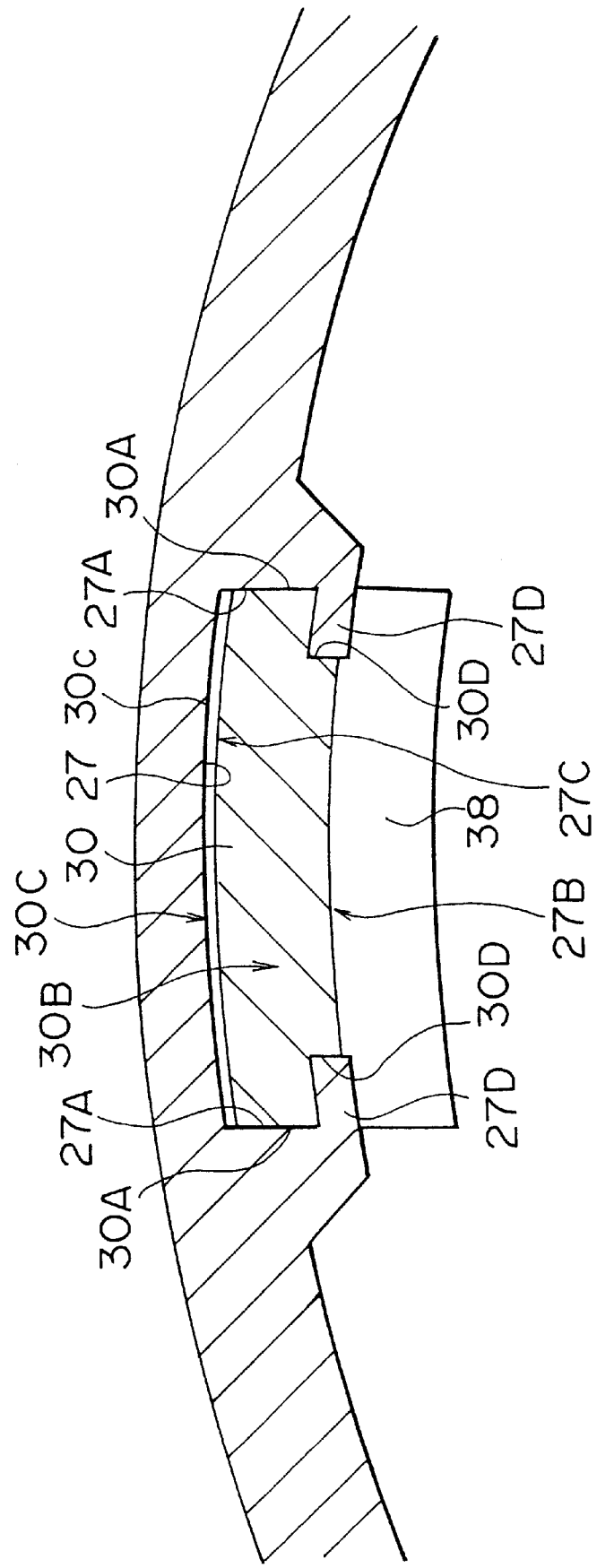
FIG. 14 is a section of a guide groove and a guide coupler of another embodiment.

As shown in FIG. 14, projecting parts 27D may be formed on the sides 27A of each guide groove 27 to make the bottom part 27C of the guide groove 27 wider than the opening part 27B. In this case, recesses 30D that couples with the projecting parts 27D are formed on both sides 30A of the guide coupler 30.

The second lens barrel 14 is arranged inside the first lens barrel 13 in the embodiment, but the first lens barrel 13 may be arranged inside the second lens barrel 14. In this case, guide grooves are formed on the outer periphery of the first lens barrel 13 to couple with guide couplers of the second lens barrel 14.

In addition, the first lens barrel 13 has the guide grooves 27 and the second lens barrel 14 has the guide couplers 30 in the embodiment, but the first lens barrel 13 may have guide couplers and the second lens barrel 14 may have guide grooves.

Also, the two guide grooves 27, the two arms 38 and the two guide couplers 30 are arranged in the embodiment, but three guide grooves 27, three arms 38 and three guide couplers 30 may be arranged at regular intervals.

Figure 15:
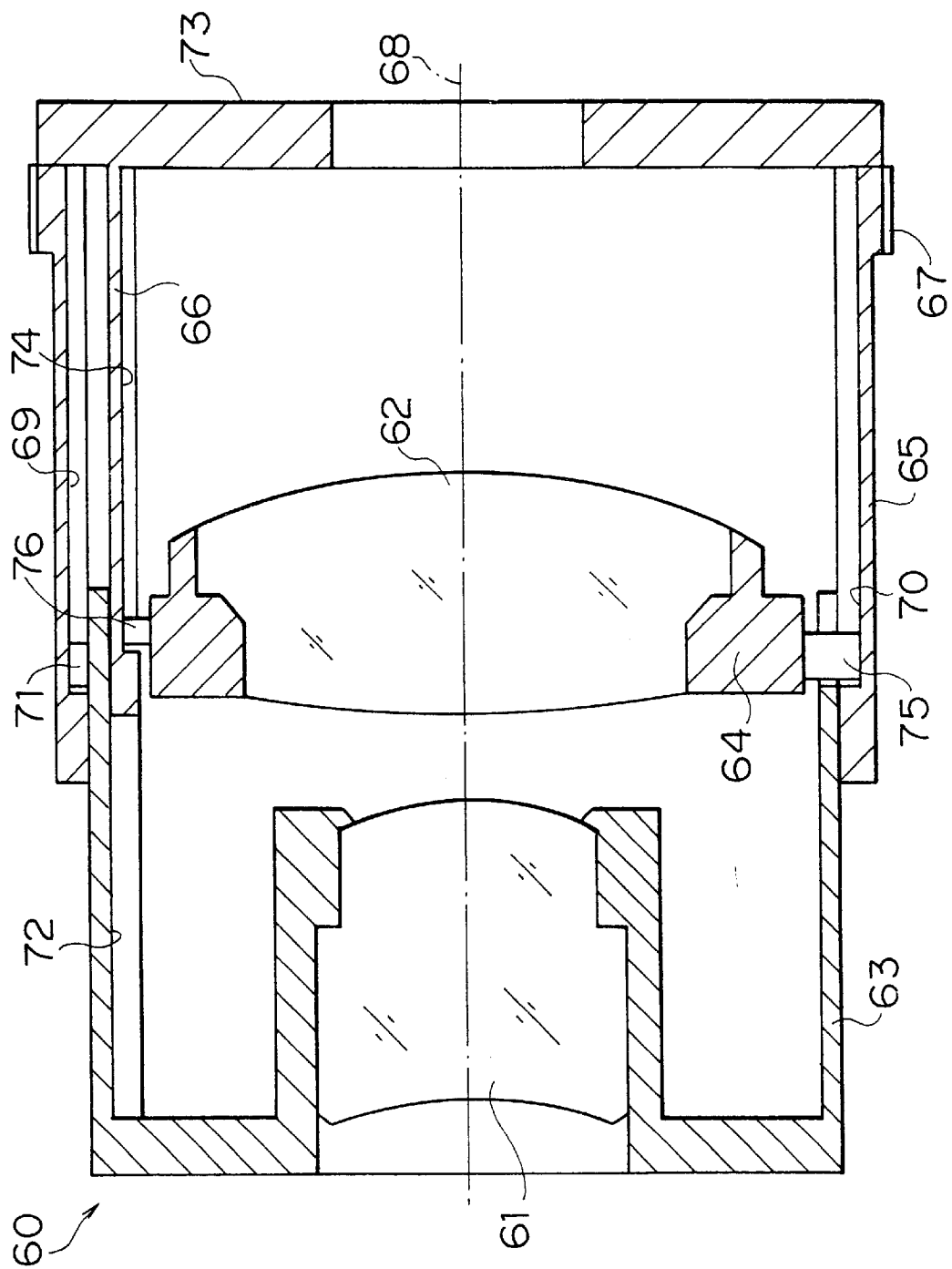
FIG. 15 is a cross section of a lens device of a second embodiment of the present invention.

FIGS. 15 and 16 are a cross section and a vertical section of a lens device 60 of a second embodiment of the present invention, respectively.

As shown in FIGS. 15 and 16, the lens device 60 comprises a first lens 61, a second lens 62, a movable barrel 63, a second lens frame 64, a rotatable barrel 65 and three guide arms 66.

A gear part 67 is formed on the outer periphery of the rotatable barrel 65. Driving force of a zoom motor (not shown) is transmitted to the gear part 67, and this rotates the rotatable barrel 65 in touch with the outer periphery of the movable barrel 63.

Three cam grooves 69 for moving the movable barrel 63 along an optical axis 68 and three cam grooves 70 for moving the second lens frame 64 along the optical axis 68 are formed on the inner periphery of the rotatable barrel 65. The cam grooves 69 and 70 are arranged at regular intervals, respectively.

The first lens 61 is held at the end of the inner periphery of the movable barrel 63, and three cam followers 71 are formed on the outer periphery of the first lens 61 at the regular intervals. The cam followers 71 are coupled with the cam grooves 69 of the rotatable barrel 65.

Three guide grooves 72 are formed on the inner periphery of the movable barrel 63 along the optical axis 68 at regular intervals, and coupled with the guide arms 66.

The guide arms 66 extend from the front end of a base 73 toward the subject at regular intervals, and guide grooves 74 are formed on the inner periphery of the guide arms 66 along the optical axis 68. The guide arms 66 are coupled with the guide grooves 72 so that the movable barrel 63 is guided along the optical axis 68 without rotating.

The second lens 62 is held on the inner periphery of the second lens frame 64. Three cam followers 75 and three guide couplers 76 are formed on the outer periphery of the second lens frame 64 at regular intervals, respectively. The cam followers 75 are coupled with the cam grooves 70 formed on the inner periphery of the rotatable barrel 65, and the guide couplers 76 are coupled with the guide grooves 74 formed on the inner periphery of the guide arms 66. The guide couplers 76 are coupled with the guide grooves 74 formed on the inner periphery of the guide arms 66 so that the second lens frame 64 is guided along the optical axis 68 without rotating.

The movable barrel 63 is guided along the optical axis 68 by the guide grooves 72 and the guide arms 66 without rotating, and the second lens frame 64 is guided along the optical axis 68 by the guide grooves 74 and the guide couplers 76 without rotating.

When the zoom motor is driven to rotate the rotatable barrel 65, the movable barrel 63 is moved along the optical axis 68 by the cam grooves 69 and the cam followers 71, and the second lens frame 64 is guided along the optical axis 68 by the cam followers 75 and the cam grooves 70.

Figure 17:
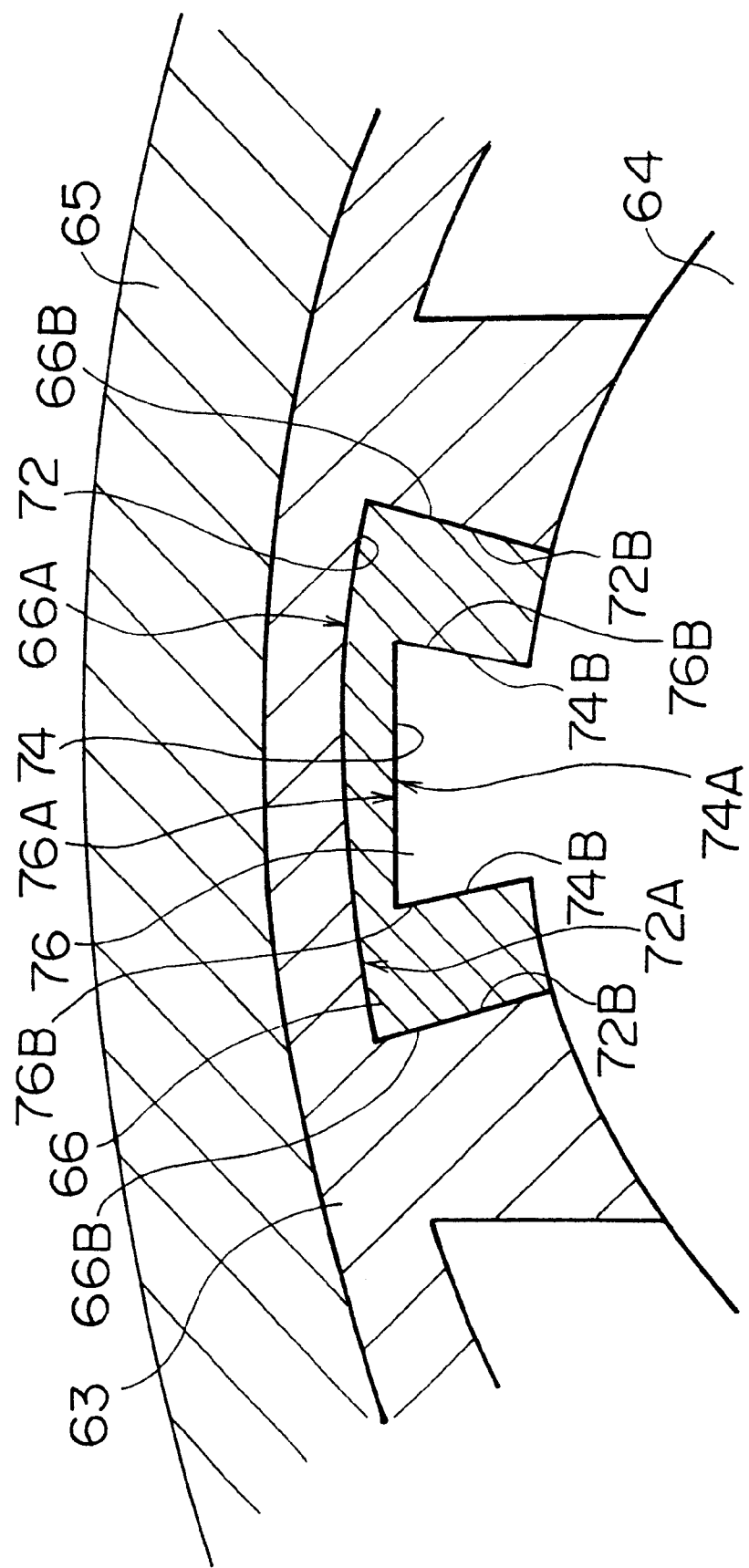
FIG. 17 is a vertical section showing a guide groove of a movable barrel and a guide arm that are coupled with each other, and a guide groove of the guide arm and a guide coupler of a second lens frame that are coupled with each other.

As described above, the movable barrel 63 is guided along the optical axis 68 by the guide grooves 72 and the guide arms 66 without rotating. As shown in FIG. 17, both sides 72B of each guide groove 72 are inclined to make a bottom part 72A wider than an opening part. Both sides 66B of each guide arm 66 are inclined to make a top part 66A wider than a base part so that the guide groove 72 and the guide arm 66 fit with each other. Therefore, the guide arms 66 do not easily come off from the guide grooves 72 even if a pressure is applied to them.

The second lens frame 64 is guided along the optical axis 68 by the guide grooves 74 and the guide couplers 76 without rotating, as described above. As shown in FIG. 17, both sides 74B of each guide groove 74 are inclined to make a bottom part 74A wider than an opening part. Both sides 76B of each guide coupler 76 are inclined to make a top part 76A wider than a base part so that the guide groove 74 and the guide coupler 76 fit with each other. Therefore, the guide couplers 76 do not easily come off from the guide grooves 74 even if a pressure is applied to them.

The entire sides 66B, 72B, 74B and 76B are inclined in the embodiment, but only a part of each side may be inclined in the same way as that in the first embodiment.

Projections may be formed on the sides 72B and 74B and recesses may be formed on the sides 66B and 76B. This makes the bottom parts of the guide grooves 72 and 74 wider than the opening parts and makes the top parts of the guide arms 66 and the guide couplers 76 wider than the base parts, in the same way as that in FIG. 14.

The lens device 2 in the first embodiment has the two lens groups 11 and 12 and the lens device 60 in the second embodiment has the two lens groups 61 and 62, but the lens device according to the present invention may have three or more lens groups.

In addition, the electronic still camera 1 has the zooming function, but it may be a two-focus camera in which the lens device is at a telephoto position, a wide-angle position or a collapsed position.

Also, the present invention may be applied not only to the electronic still camera but also a silver halide camera.

The angles of the inclinations are preferably between 5° and 30°, and more preferably between 5° and 20°.

As set forth hereinabove, the bottom parts of the guide grooves are wider than the opening parts, and the top parts of the guide members are wider than the base parts. Therefore, the guide members do not easily come off from the guide grooves even if the pressure is applied to them.

It should be understood, however, that there is no intention to limit the invention to the specific forms disclosed, but on the contrary, the invention is to cover all modifications, alternate constructions and equivalents coming within the spirit and scope of the invention as expressed in the appended claims.

What is claimed is:

1. A lens device comprising:
   a lens barrel that holds a lens and has a guide groove formed on a periphery of the lens barrel along an optical axis, wherein a bottom part of the guide groove is wider than an opening part of the guide groove, and both sides of the guide groove are inclined; and
   a guide member that is coupled with the guide groove to guide the lens barrel along the optical axis, wherein a top part of the guide member is wider than a base part of the guide member, and both sides of the guide member are inclined.

2. The lens device according to claim 1, wherein an angle of inclination of the inclined sides of the guide groove and of the inclined sides of the guide member is between 5° and 30°.

3. The lens device according to claim 2, wherein said angle of inclination is between 5° and 20°.

4. A lens device comprising:
   a lens barrel that holds a lens and has a guide groove formed on a periphery of the lens barrel along an optical axis, wherein a bottom part of the guide groove is wider than an opening part of the guide groove; and
   a guide member that is coupled with the guide groove to guide the lens barrel along the optical axis, wherein a top part of the guide member is wider than a base part of the guide member, and the guide member is provided at a front end of an arm member arranged along the optical axis.

5. The lens device as defined in claim 4, wherein both sides of the guide groove and both sides of the guide member are inclined.

6. The lens device as defined in claim 4, wherein a part of each side of the guide groove and a part of each side of the guide member are inclined.

7. The lens device according to claim 4, wherein said lens is a first lens and said lens barrel is a movable lens barrel, said lens device further comprising:
   a rotatable barrel, wherein said movable lens barrel is positioned within an interior of said rotatable barrel; and
   a second lens and a second lens frame, said second lens frame being operatively engaged with said rotatable barrel.

8. The lens device according to claim 7, further comprising;
   a cam follower;
   a guide coupler, said cam follower and said guide coupler being formed on an outer periphery of said second lens frame; and
   a cam groove on an inner periphery of the rotatable barrel; wherein said cam follower is operatively engaged with said cam groove of said rotatable barrel and said guide coupler is operatively engaged with a guide groove formed along an inner periphery of said arm member.

9. The lens device according to claim 4, wherein said lens is a first lens and said lens barrel is a first lens barrel, said lens device further comprising:
   a second lens and a second lens barrel;
   a movable barrel, said movable barrel including
   a guide groove formed on a periphery of the lens barrel along the optical axis, wherein a bottom part of the guide groove is wider than an opening part of the guide groove, and
   a guide member that is coupled with the guide groove to guide the lens barrel along the optical axis, wherein a top part of the guide member is wider than a base part of the guide member;
   a fixed barrel; and
   a rotatable barrel.

10. A lens device comprising:
    a lens barrel that holds a lens and has a guide groove formed on a periphery of the lens barrel along an optical axis, wherein a bottom part of the guide groove is wider than an opening part of the guide groove, and a part of each side of the guide groove is inclined; and
    a guide member that is coupled with the guide groove to guide the lens barrel along the optical axis, wherein a top part of the guide member is wider than a base part of the guide member, and a part of each side of the guide member is inclined.

11. The lens device according to claim 10, wherein an angle of inclination of the inclined part s of the guide groove and of the inclined part s of the guide member is between 5° and 30°.

12. The lens device according to claim 11, wherein said angle of inclination is between 5° and 20°.

13. A lens device comprising:
    a lens barrel that holds a lens;
    an arm member that is provided along an optical axis and has a guide groove formed on a periphery of the arm member along the optical axis, wherein a bottom part of the guide groove is wider than an opening part of the guide groove, and both sides of the guide groove are inclined; and
    a guide member that is coupled with the guide groove to guide the lens barrel along the optical axis, wherein a top part of the guide member is wider than a base part of the guide member, and both sides of the guide member are inclined.

14. The lens device according to claim 13, wherein an angle of inclination of the inclined sides of the guide groove and of the inclined sides of the guide member is between 5° and 30°.

15. The lens device according to claim 14, wherein said angle of inclination is between 5° and 20°.

16. A lens device comprising:
    a lens barrel that holds a lens;
    an arm member that is provided along an optical axis and has a guide groove formed on a periphery of the arm member along the optical axis, wherein a bottom part of the guide groove is wider than an opening part of the guide groove, and a part of each side of the guide groove is inclined; and
    a guide member that is coupled with the guide groove to guide the lens barrel along the optical axis, wherein a top part of the guide member is wider than a base part of the guide member, and a part of each side of the guide member is inclined.

17. The lens device according to claim 16, wherein an angle of inclination of the inclined parts of the guide groove and of the inclined parts of the guide member is between 5° and 30°.

18. The lens device according to claim 17, wherein said angle of inclination is between 5° and 20°.

* * * * *